Feb. 26, 1957 R. C. FERGASON 2,782,650
CHAIN TIGHTENER
Filed Aug. 6, 1954 4 Sheets-Sheet 3

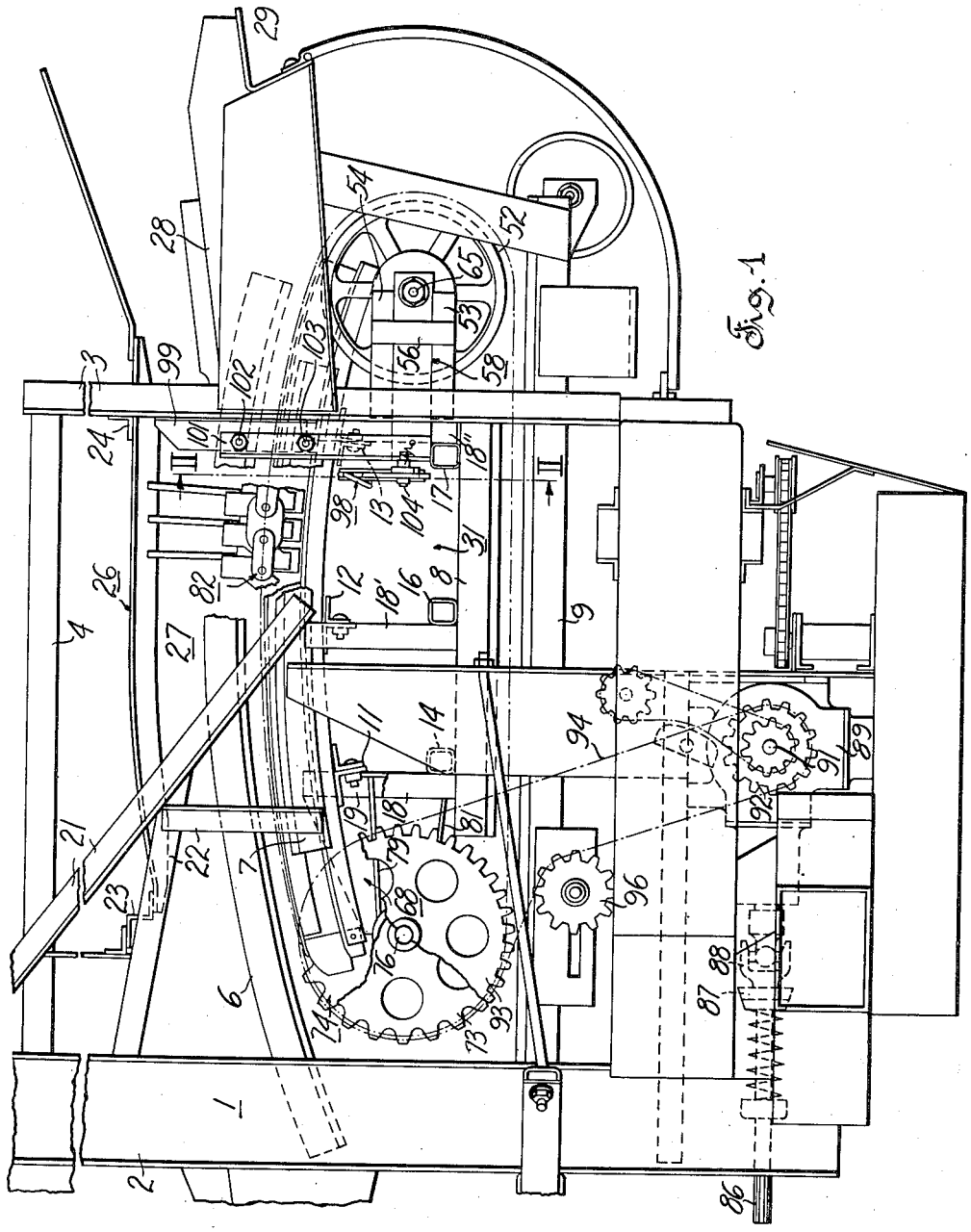

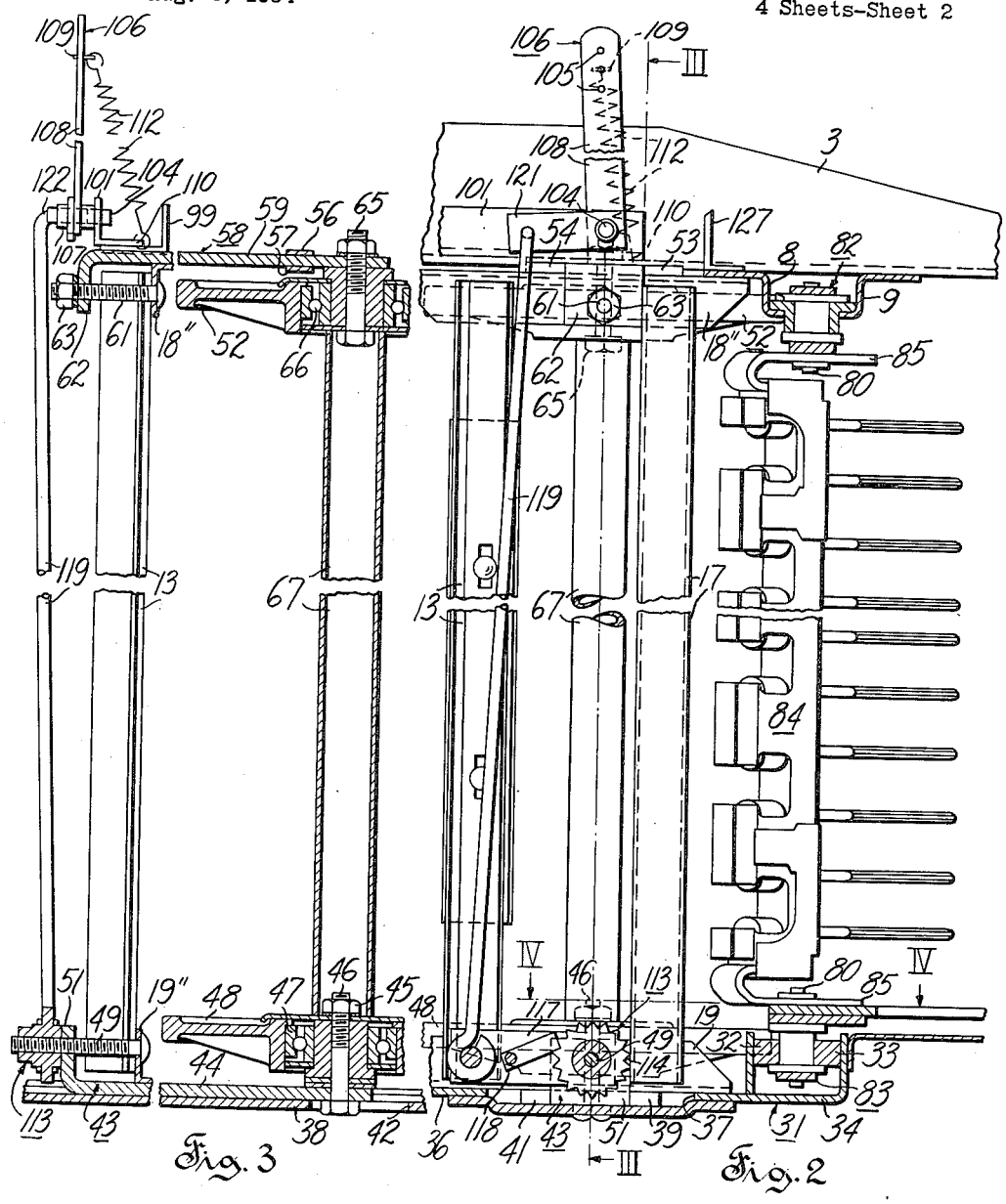

Inventor
Rector C. Fergason
by
Attorney

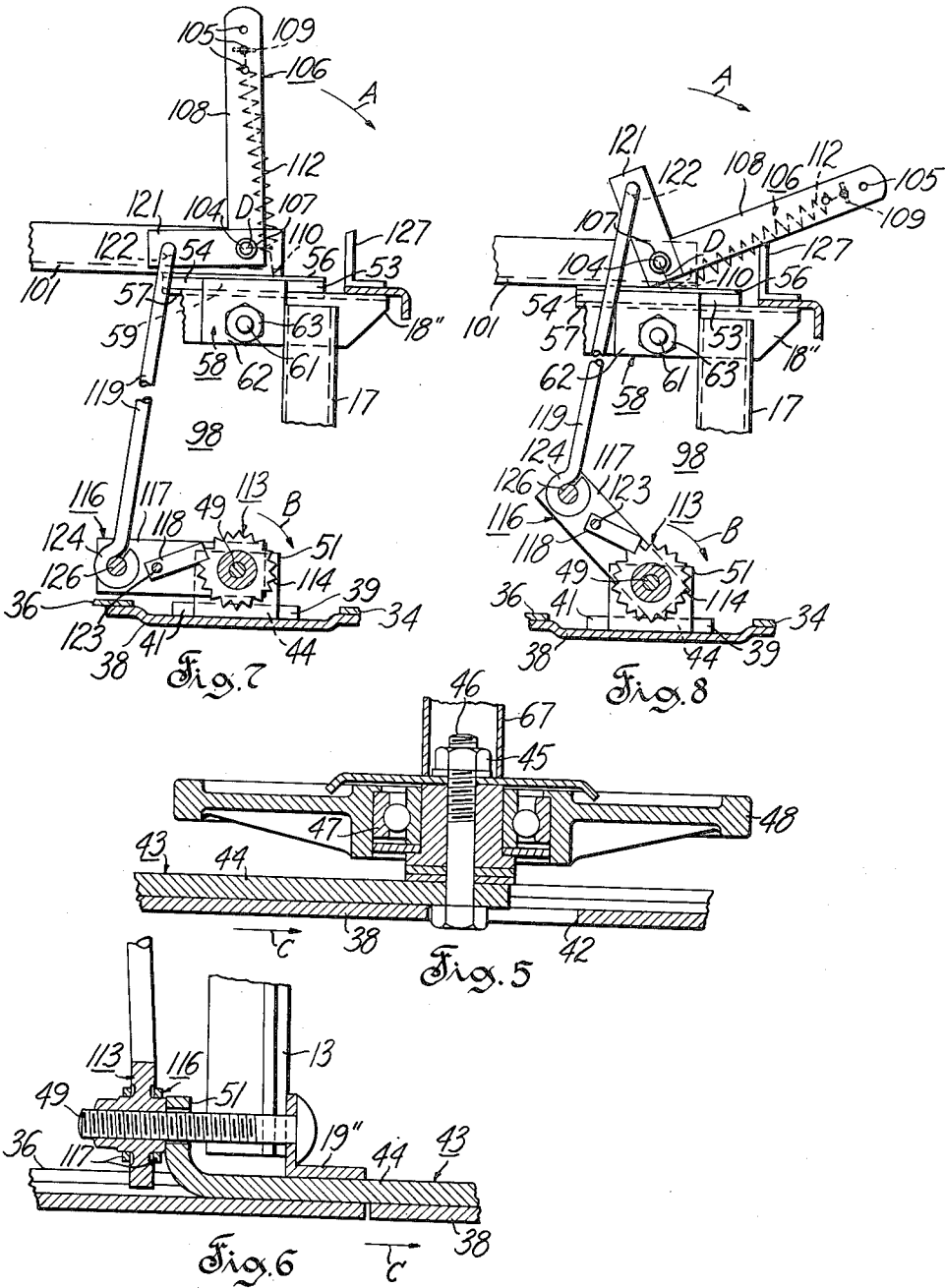

United States Patent Office 2,782,650
Patented Feb. 26, 1957

2,782,650

CHAIN TIGHTENER

Rector C. Fergason, Gadsden, Ala., assignor to Allis-Chalmers Manufacturing Company, Milwaukee, Wis.

Application August 6, 1954, Serial No. 448,348

7 Claims. (Cl. 74—242.14)

The invention relates to belt drives and the like, and it is concerned more particularly with a slack take-up mechanism which will keep the endless flexible power transmitting element of such drives under proper tension.

In mechanical cotton pickers of a certain type, as shown for instance in U. S. Patent 2,671,298, granted March 9, 1954, to R. C. Fergason, a picking unit incorporates two endless chains, one arranged for travel along a horizontal oblong path in the lower part of the unit and the other similarly arranged in the upper part of the unit. A series of vertical slats which carry horizontal picking spindles are secured to the lower and upper chains, and driving power applied to the chains causes the spindle slats to move in endless succession through a picking tunnel at one side of the unit and through a stripper mechanism at the other side of the unit. It is important for the proper operation of the picking unit that the chains be kept under proper tension, but this has been found difficult to accomplish in a practical and fully satisfactory manner. The lower chain normally wears faster than the upper chain, which is at least in part due to the fact that more dust and injurious foreign matter enter the lower part of the unit than reaches the upper part. Consequently, the lower chain requires slack take-up more often than the upper chain, but since the lower part of the unit is relatively inaccessible for the purpose of making the necessary adjustment, undue slackening of the lower chain has heretofore been a serious cause of trouble.

Generally, it is an object of the invention to provide an improved slack take-up mechanism which lends itself for use in installations such as the mentioned cotton picking unit, and by means of which proper tension of a chain or other endless flexible power transmitting element may be maintained in a practical and fully satisfactory manner.

More specifically, it is an object of the invention to provide an improved slack take-up mechanism for belt drives which will be automatically effective to adjust one of the chain supporting wheels or other element by means of which an endless power transmitting element may be tightened, as the need for such adjustment arises due to stretch of the endless power transmitting element or wear thereof and its associated parts.

A further object of the invention is to provide an improved slack take-up mechanism of the hereinabove outlined character wherein a belt contacting element is adjusted in belt tightening direction by means of a preloaded spring and a motion transmitting device, such as a screw and nut, which multiplies the spring force and is also self-locking so as to positively resist movement of the belt contacting element in belt slackening direction.

A still further object of the invention is to provide an improved slack take-up mechanism of the hereinabove outlined character wherein a substantially uniform adjusting force is exerted upon the belt contacting element in belt tightening direction, throughout a predetermined range of adjustment.

The foregoing and other objects and advantages are attained by the present invention, various novel features of which will become apparent from the description here-in and accompanying drawings disclosing a preferred embodiment of the invention, and will be set forth in the appended claims.

Referring to the drawings:

Fig. 1 is a plan view of a cotton picking unit embodying the invention, with parts broken away and shown in section for the purposes of disclosure;

Fig. 2 is a partial sectional view taken on line II—II of Fig. 1;

Fig. 3 is a partial sectional view taken on line III—III of Fig. 2;

Fig. 5 is an enlarged sectional view of the lower idler wheel taken along the line V—V of Fig. 4;

Fig. 6 is an enlarged sectional view taken on line VI—VI of Fig. 4;

Fig. 7 is a diagrammatic view of the working members showing the tightening mechanism in a starting position; and Fig. 8 is a diagrammatic view similar to Fig. 7 but showing the tightening mechanism in a finish position.

Figure 4:
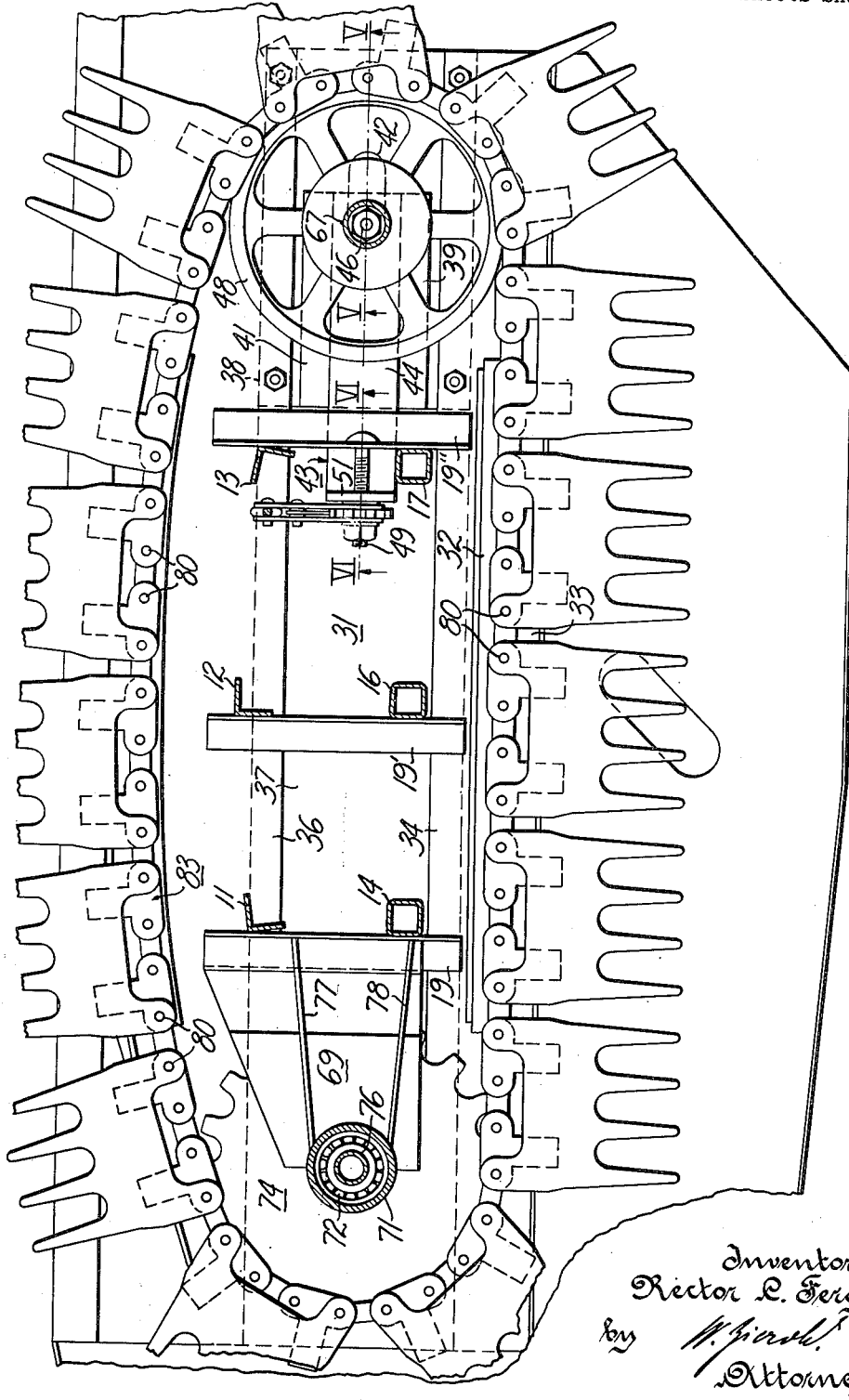
Fig. 4 is a sectional plan view of the cotton picking unit shown in Fig. 1 taken generally along the plane indicated by line IV—IV of Fig. 2.

The cotton picking unit shown in Fig. 1 comprises a frame structure or support 1 of generally conventional construction including a rigid top forward cross member 2 and a rear cross member 3. Rigidly connected between the cross members 2 and 3 are longitudinally extending frame elements including a side angle iron 4, a first pair of chain carrying rails 6 and 7, and a second pair of chain carrying rails 8 and 9 (Fig. 2). The frame structure 1 further includes a group of three vertical angle irons 11, 12 and 13 (Fig. 4) and a group of upright square tubes 14, 16 and 17. The angle iron 11 and tube 14 are rigidly united at their upper ends by a transverse angle brace 18 (Fig. 1) and the lower ends of angle iron 11 and tube 14 are similarly secured to a transverse brace 19 (Fig. 4). The upper and lower ends of angle irons 12, 13 and tubes 16, 17 are similarly secured to upper transverse braces 18' and 18" and lower braces 19' and 19".

A diagonal brace 21 (Fig. 1) rigidly connects rails 6 and 7 at a point intermediate their ends with cross member 2 at a point not shown. An L-brace 22 rigidly connects forward portions of rails 6 and 7 with an intermediate point of diagonal brace 21 and with cross member 2. Support angle irons 23 and 24 depend from L-brace 22 and rear cross member 3, respectively, to support a stalk crowder generally designated by the reference character 26 which serves to define one side of the picking tunnel 27. The other side of the picking tunnel 27 is defined by a vertically spaced series of horizontal channel iron members 28 or stalk guides (Fig. 1). These channel members or stalk guides 28 are supported at the front of the picking unit by a vertical support (not shown) and at the rear of the tunnel by vertical post 29.

Referring to Fig. 1, it will be noted that the three upper transverse braces 18, 18' and 18" are rigidly secured to chain rail 7 at the picking side of the unit and to chain rail 8 at the stripper side. The lower transverse braces 19, 19' and 19" are rigidly secured, as by welding, to the bottom or floor 31 (Fig. 2) of the frame structure 1. In addition, floor 31 supports lower chain rails 32 and 33 (Fig. 2) below upper rails 8 and 9, and another pair of lower chain rails (not shown) below upper rails 6 and 7 (Fig. 1). As best shown in Fig. 2, the bottom or floor of the picking unit comprises a pair of side plates 34 and 36 separated by a space 37 (Fig. 4) which runs longitudinally of the frame structure. A bottom shield for the space 37 includes an idler support section 38 (Fig. 4) which is detachably secured between plates 34 and 36 as by bolting. As shown in Figs. 2, 4 and 7, idler support section 38 includes a pair of spaced longitudinally extending guide bars 39 and 41, and, as shown in Figs. 4 and 5 an elongated slot 42 is formed in the rear portion of section 38.

Idler support section 38 slidably receives between guide bars 39 and 41 an L-shaped slide bracket or thrust transfer part 43 (Figs. 5 and 6), the long leg 44 of which is slid under rear brace 19" and held against transverse displacement by guide bars 39 and 41. As best shown in Fig. 5, the rear end of leg 44 contains a bolt receiving aperture positioned generally in registry with elongated slot 42. A cap screw 46 is passed through the aperture in leg 44 with its threaded end extending above idler support section 38 and with its head in registry with slot 42. Cap screw 46 and slide bracket 43 support lower idler wheel bearing 47 and lower chain supporting idler wheel or belt contacting element 48. A nut 45 is threaded on screw 46 to secure idler wheel 48 in place on slide bracket 43.

Rigidly secured to the transverse angle iron brace 19" as by welding, is a carriage bolt or threaded thrust transmitting element 49 (Fig. 6), the shank of the bolt 49 extending longitudinally toward the front of the unit. The short leg 51 of the slide bracket 43 extends upwardly from leg 44, and is provided with an aperture slightly larger than the diameter of bolt 49. As slide bracket 43 is placed into assembled position, leg 44 slides under brace 19", and apertured leg 51 passes over bolt 49 as best shown in Fig. 6. The function of slide bracket 43 is to mount wheel 48 for back and forth movement in chain tightening and chain slackening directions as will be more fully explained hereinbelow.

An upper chain supporting wheel 52 (Fig. 1) is mounted for back and forth adjustment in chain tightening and chain slackening directions by means of a pair of spaced guide bars 53 and 54 which are rigidly secured, as by welding, to upper brace 18". As shown in Figs. 1 and 3, a pair of transverse support straps 56 and 57 are rigidly attached, as by welding, to opposite top and bottom sides of bars 53 and 54 thereby connecting the outer ends of bars 53 and 54 together and providing a mounting bracket for an upper slide bracket 58. Slide bracket 58 is identical to slide bracket 43, having its long leg 59 slidably passed through the aperture defined by bars 53 and 54, and straps 56 and 57. Angle iron brace 18" rigidly supports carriage bolt 61, and slide bracket 58 has a short leg 62 having an aperture adapted to slidably receive the shank of a bolt 61. A nut 63 is threaded on bolt 61 and when tightened is placed in load transmitting engagement with leg 62 of slide bracket 58 to move the latter in chain tightening direction toward the rear of the picking unit, that is, to the right as viewed in Fig. 3. Leg 59 is provided with a vertical aperture at its rear end; and upper idler 52 is dependingly mounted on leg 59 by means of cap screw 65 and bearing assembly 66. In order to insure proper vertical spacing of the idler wheels 48 and 52 and to prevent undue strain on slide bracket 59 a length of steel tubing 67 (Figs. 2 and 3) is inserted between the idler wheels 48 and 52.

Upper and lower drive sprockets 73 and 74 (Figs. 1 and 4) are mounted on the forward part of support structure 1 in the following manner. A stationary upper bracket 68 is rigidly secured to upper front brace 18 (Fig. 1), as by welding. A lower bracket 69 (Fig. 4) corresponding to upper bracket 68 is rigidly secured, as by welding, to lower front brace 19. A vertical tube 71 surrounding drive shaft 76 (Fig. 4) is rigidly secured at its upper and lower ends in the stationary brackets 68 and 69, as by welding. Roller bearing assembly 72 (Fig. 4) is mounted in the lower end of tube 71 and a similar bearing, not shown, is mounted in the upper end of tube 71 for rotatably supporting drive shaft 76. Upper and lower drive sprockets 73 and 74 are fixedly attached to drive shaft 76. Additional bracings between tube 71 and the frame structure 1 are provided by gusset plates 77 and 78 (Fig. 4) fixedly attached adjacent the lower end of tube 71, and by similar gusset plates 79 and 81 (Fig. 1) fixedly attached adjacent the upper end of tube 71.

An upper drive chain 82 (Figs. 1 and 2), of conventional roller link construction, is trained about upper chain supporting idler wheel 52 and drive sprocket 73, and a similar lower drive chain 83 (Fig. 4) is trained about idler 48 and drive sprocket 74. Vertical spindle carrying slats 84 (Fig. 2) are pivotally connected at their upper and lower ends to extensions of the pivot pins 80 of the chains 82 and 83 by means of suitable hinge brackets 85 (Fig. 2). Further details of the slat structure and mounting may be had by reference to the mentioned U. S. Patent 2,671,298.

The herein disclosed cotton picking unit is adapted for mounting on a conventional farm tractor and it is powered by a coupling shaft 86 (Fig. 1) connected with a power takeoff shaft (not shown) of the tractor. A slip clutch 87 and universal joint 88 serve to connect shaft 86 with main drive gear box 89. Main drive gear shaft 91 nonrotatably supports drive sprocket 92. Driven sprocket 93 is nonrotatably secured to drive shaft 76, and a drive chain 94 is operatively trained about sprocket 93 and sprocket 92 to provide power for driving upper and lower drive sprockets 73 and 74 and thereby upper and lower chains 82 and 83. An idler sprocket 96 is conventionally arranged for tensioning the drive chain 94.

It is readily apparent that the described mounting of the upper and lower chain supporting wheels or idlers 52 and 48 provides for back and forth movement thereof transversely of their axis in chain or belt tightening and chain or belt slackening directions. That is, the slidable mounting of the chain supporting idler wheels 52 and 48 will permit the center distance between the upper idler wheel 52 and drive sprockets 73 and the center distance between the lower idler wheel 48 and drive sprocket 74 to be increased or decreased to provide the proper amount of chain tension.

In the upper chain drive, the nut 63 which is placed in load transmitting engagement with upper slide bracket 58, is easily accessible and readily adjustable with a wrench. However, the lower slide bracket 43 is in a relatively inaccessible location in which proper tensioning adjustment would normally be difficult. For the purpose of overcoming this difficulty provisions are made as follows.

An automatic slack take-up mechanism, generally indicated by the reference character 98 in Figs. 7 and 8, is operatively mounted on the frame structure 1. Referring to Fig. 1, an angle iron support 99 has an upright flange in face to face engagement with an upright flange of rear cross member 3 and is rigidly secured thereto, as by bolting. An angle iron 101 is placed on angle iron 99 to extend parallel to cross member 3 and has one end fixedly held in place by bolts 102 and 103. As shown in Figs. 7 and 8, a pivot pin 104 is fixedly mounted adjacent the free end of angle iron 101 and vertically above the carriage bolts 49 and 61. A rocker 106 in the form of a bell crank lever is provided with a spacing bushing 107 (Fig. 3) therethrough adjacent its fulcrum, the bushing being of a size adapted to be slipped over pin 104. Rocker 106 is secured in position by means of a cotter key inserted through pin 104. Long arm 108 of rocker 106 is provided with a series of apertures 105 adapted to receive the shank of an eye bolt 109 (Figs. 7 and 8). Resilient means, represented in Figs. 7 and 8 by an axially contractable and expandable coil spring 112, is operatively interposed between support angle 101 and rocker 106. Coil spring 112 is anchored on the frame structure (support angle 101) at a point 110 in laterally and downwardly spaced relation to the pivot axis of bell crank lever 106 and is anchored at its other end in the loop of eye bolt 109.

The slack take-up mechanism further includes the following mechanism which is operatively interposed in the following manner between a lower portion of the frame structure and the lower chain supporting wheel 48. As above described, lower idler wheel 48 is adjustably mounted by means of slide bracket 43 at one end of the oblong path of chain travel for back and forth movement in chain tightening and chain slackening directions. Bolt 49 (Fig. 6) is part of a pair of variable length thrust transmitting elements which are relatively rotatable and in screw threaded engagement with each other. A nut 113 (Fig. 6) forms a thrust transmitting and rotatable adjusting element and is operatively connected to belt contacting element or idler wheel 48 for back and forth movement in unison therewith. That is, adjusting element 113 is threaded on the other nonrotatably mounted thrust transmitting element which is, bolt 49, and upon turning of adjusting element 113 it will be placed in thrust transmitting engagement with slide bracket 43 which transmits the thrust to idler wheel 48.

It will be noted by reference to Fig. 6 that a one-way torque transmitting means 116 is mounted on the support for rotating adjusting element 113. The one-way torque transmitting means includes a lever 117 mounted for vertical back and forth swinging movement relative to the adjusting element 113 about the axis of rotation of the latter, and pawl means 118 operatively interposed between lever 117 and adjusting element 113 for turning the latter in one direction upon swinging movement of lever 117 in one direction and permitting idling swinging movement of lever 117 in the opposite direction. It will be noted by reference to Figs. 7 and 8 that adjusting element 113 is provided with integrally formed ratchet teeth 114 with which pawl 118 cooperates.

Actuating means for the ratchet mechanism 116 are afforded by the rocker or bell crank 106 which is pivotally mounted on the upper portion of frame member 101, coil spring 112 which is operatively interposed between frame member 101 and rocker 106 for biasing the latter in the direction of arrow A in Fig. 7, and a connecting rod 119 operatively interposed between short arm 121 of rocker 106 and lever 117. The upper end of connecting rod 119 has a right angle portion 122 (Fig. 3) loosely fitted in an aperture provided in arm 121 and is retained thereon by means of a cotter key. As best appears in Fig. 6, lever 117 is composed of two parallel arms extending radially from adjusting element 113 at the axially opposite sides of the latter. Pawl 118 is pivotally mounted on a pin 123, the ends of which are mounted in opposite sides of parallel lever arms 117. The lower end of connecting rod 119 is pivotally supported on lever 117 in a similar manner. Rod 119 has an eyelet 124 formed on the lower end thereof and adapted to receive a pin 125 passed through registering apertures in parallel lever arms 117.

For purposes of analysis of the operation of the slack take-up mechanism reference may first be made to Fig. 7 in which the mechanism is in a starting position with spring 112 in a condition of maximum tension. It will be noted that bell crank 106 cannot be pivoted to the left any farther than shown in Fig. 7 due to the fact that lever 116 will contact floor section 36. Floor section 36 thus serves as a limit stop when bell crank 106 is placed in the starting position. Coil spring 112 is constantly biasing rocker 106 in a clockwise direction as viewed in Fig. 7 and indicated by arrow A. This clockwise movement of rocker 106 raises short arm 121 and consequently connecting rod 119. Parallel lever arm 117 is urged upward as indicated by arrow B in Fig. 7, and pawl 118, which is operatively interposed between lever 117 and thrust transmitting element 113, engages one of the ratchet teeth 114 and thereby turns element 113. Element 113 is in screw threaded engagement with bolt 49 and as rotation takes place adjusting element 113 contacts leg 51 of idler wheel support 43 and slidably urges support or thrust transfer part 43 in a belt or chain tightening direction as indicated by arrow C in Figs. 5 and 6. This movement increases the center distance between the lower chain supporting wheels and thereby tensions the lower chain.

As the coil spring 112 is continuously urging rocker 106, it is obvious that a continuous torque is being applied to adjusting element 113. In addition, coil spring 112 is so selected and mounted as to provide potential energy sufficient to produce a predetermined substantially uniform chain tension. That is, the resistance of lower chain 83 to tightening force applied by spring 112 increases as the chain tension increases and will ultimately reach a point where the force of spring 112 is insufficient to overcome the resistance of the chain to further tightening. When this condition of balance is reached rocker 106 will not move but will remain stationary until further wear on the chain causes it to relax. When relaxing occurs spring 112 has sufficient tension to again tighten chain 83.

It is to be noted that as spring 112 moves bell crank 106 in the direction of arrow A spring 112 will relax and lose some of its potential energy. To compensate for this loss and to keep the torque applied to element 113 substantially uniform lever arm 108 of rocker is arranged so that the effective torque arm of the spring 112 increases to compensate for the loss of spring tension. In this way the torque remains substantially constant and the chain is thereby maintained at a substantially constant running tension.

It will be understood that the screw threads on the adjusting element 113 and bolt 49 provide a high force amplification which permits the use of a relatively light coil spring to tension the chain. In addition, the screw threads are self-locking and prevent the potential energy stored in the tensioned chain from causing adjusting element 113 to rotate in a direction reverse to that indicated by arrow B in Fig. 7 when the ratchet assembly is attempted to be moved in an idling direction for a new bite on the ratchet teeth 114.

After a certain amount of tensioning has taken place, arm 108 of rocker will rest upon stop bracket 127 which is suitably mounted on chain rail 8. The entire slack take-up mechanism is now in the position indicated in Fig. 8 and when the operator sees the lever in this position he may move arm 108 to the left as viewed in Fig. 8. This automatically retensions coil spring 112 and it will again automatically move arm 108 in the direction of arrow A in Fig. 7. As arm 108 is being returned to its starting position pawl 118 moves in an idling direction over the ratchet teeth 114. When lever 117 reaches the starting position pawl 118 will gravitate into engagement with one of the ratchet teeth. It is to be understood that pawl 118 may be spring biased, if desired, and such provision may be necessary if the mechanism were mounted in a different position than that shown.

The apertures 105 in the long arm 108 of bell crank lever 106 are adapted to receive eye bolt 109, and the operator may therefore vary the tension of lower chain 83. Thus, if a greater running tension on the chain is desired eyebolt 109 is placed in the top or farthest aperture 105 thus stretching the coil spring 112 a greater distance to give it a greater energy potential. Should a lesser tension be desired eyebolt 109 is placed in one of the lower apertures thus reducing the length of spring 112.

It will be apparent by reference to Figs. 7 and 8 that spring 112 has a fixed anchor point 110 on the frame structure 101 and another anchor point on long arm 108 of bell crank 106. The fixed anchor point 110 of spring 112 is radially spaced from the pivot center 104 of bell crank 106 in such relation to the arc of movement of the other anchor point in eyebolt 109 of spring 112 that the effective torque arm (indicated by line D in Figs. 7 and 8)

of said spring will increase upon pivotal movement of bell crank lever 106 in a predetermined direction, that is the direction indicated by arrow A in Fig. 7.

From the foregoing it will be apparent that the construction hereinbefore described for purposes of illustration effectively accomplishes all of the advantages and objects previously stated herein. Also it should be understood that while a preferred embodiment of the invention is shown and described for purposes of illustration, it is not intended to limit the protection to be secured to the herein disclosed details of construction and combination, as various modifications within the scope of the appended claims may occur to persons skilled in the art.

It is claimed and desired to secure by Letters Patent:

1. A slack take-up mechanism for an endless belt drive comprising, in combination, a support; a belt contacting element mounted on said support for back and forth movement in belt tightening and belt slackening directions; variable length thrust transmitting means including an adjusting element mounted on said support in rotatable relation to the latter and to said belt contacting element for selectively securing said belt contacting element in different operative positions against movement in said belt slackening direction and for selectively moving said belt contacting element from one of said operative positions to another in said belt tensioning direction by rotation of said adjusting element in one direction; one-way torque transmitting means operatively associated with said adjusting element and including a rocker pivotally mounted on said support for rotating said adjusting element in said one direction by pivotal movement of said rocker in a predetermined direction; and resilient means operatively interposed between said support and rocker for biasing the latter in said predetermined direction.

2. A slack take-up mechanism for an endless belt drive comprising, in combination, a support; a belt contacting element mounted on said support for back and forth movement in belt tightening and belt slackening directions; a pair of relatively rotatable thrust transmitting elements in screw threaded engagement with each other and operatively interposed between said support and belt contacting element for selectively securing said belt contacting element in different operative positions against movement in said belt slackening direction and for selectively moving said belt contacting element from one of said operative positions to another in said belt tightening direction by rotation of one of said thrust transmitting elements in one direction relative to the other; one-way torque transmitting means including a rocker pivotally mounted on said support for rotating said one thrust transmitting element in said one direction by pivotal movement of said rocker in a predetermined direction; and resilient means operatively interposed between said support and rocker for biasing the latter in said predetermined direction.

3. A slack take-up mechanism as set forth in claim 2, wherein said one thrust transmitting element is operatively connected with said belt contacting element for back and forth movement in unison with the latter, and the other of said thrust transmitting elements is nonrotatably mounted on said support in an axially fixed position relative to the latter.

4. A slack take-up mechanism for an endless belt drive comprising, in combination, a support; a belt contacting element mounted on said support for back and forth movement in belt tightening and belt slackening directions; variable length thrust transmitting means including an adjusting element mounted on said support in rotatable relation to the latter and to said belt contacting element, for selectively securing said belt contacting element in different operative positions against movement in said belt slackening direction and for selectively moving said belt contacting element from one of said operative positions to another in said belt tensioning direction by rotation of said adjusting element in one direction to move said belt contacting element in said belt tightening direction; a lever mounted for swinging movement relative to said adjusting element about the axis of rotation of the latter in forward and reverse directions, pawl means operatively interposed between said lever and adjusting element for turning the latter in said one direction upon swinging movement of said lever in said forward direction and permitting idling movement of said lever in said reverse direction; and actuating means for said lever including a spring element anchored on said support and operatively connected with said lever so as to bias the latter in said forward direction.

5. In a picking unit for cotton harvesters of the type wherein a pair of upper and lower endless conveyer chains are operatively mounted on a frame structure for travel in an oblong path, the combination of a supporting wheel for said lower chain adjustably mounted on said frame structure at one end of said oblong path for back and forth movement in chain tightening and chain slackening directions; a pair of relatively rotatable thrust transmitting elements in screw threaded engagement with each other and operatively interposed between a lower portion of said frame structure and said wheel for selectively securing said wheel in different operative positions against movement in said chain slackening direction and for selectively moving said wheel from one of said operative positions to another in said chain tightening direction by rotation of one of said thrust transmitting elements in one direction relative to the other; a lever mounted for vertical back and forth swinging movement relative to said one thrust transmitting element about the axis of rotation of the latter; pawl means operatively interposed between said lever and said one thrust transmitting element for turning the latter in said one direction upon said swinging movement of said lever in one direction and permitting idling swinging movement of said lever in the opposite direction; a rocker pivotally mounted on an upper portion of said frame structure; a connecting rod operatively interposed between said rocker and lever for swinging the latter in said one direction by pivotal movement of said rocker in a predetermined direction; and resilient means operatively interposed between said frame structure and said rocker for biasing the latter in said predetermined direction.

6. The combination set forth in claim 5, wherein a bell crank lever forming said rocker has one of its arms pivotally connected with the upper end of said connecting rod, and wherein an axially contractable and expansible coil spring forming said resilient means has a fixed anchor point on said frame structure and another anchor point on the other arm of said bell crank lever.

7. The combination set forth in claim 6, wherein the fixed anchor point of said spring on said frame is radially spaced from the pivot center of said bell crank lever in such relation to the arc of movement of said other anchor point of said spring that the effective torque arm of said spring will increase upon said pivotal movement of said bell crank lever in said predetermined direction.

References Cited in the file of this patent

UNITED STATES PATENTS

| | | |
|---|---|---|
| 1,796,127 | Stephenson | Mar. 10, 1931 |
| 2,635,736 | Rust | Apr. 21, 1953 |
| 2,671,298 | Fergason | Mar. 9, 1954 |